(12) United States Patent　(10) Patent No.: US 6,937,355 B1
Miyazawa et al.　(45) Date of Patent: Aug. 30, 2005

(54) DATA COMMUNICATIONS APPARATUS FOR RESUMING DATA TRANSFER AFTER INTERRUPTION

(75) Inventors: Shunsaku Miyazawa, Nagano (JP); Hiroshi Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/531,214

(22) Filed: Mar. 20, 2000

(30) Foreign Application Priority Data

Mar. 19, 1999　(JP)　.................................. 11-076095
Dec. 9, 1999　(JP)　.................................. 11-350460

(51) Int. Cl.$^7$ ........................... G06F 3/12; G06F 13/00
(52) U.S. Cl. .................................... 358/1.14; 358/1.15
(58) Field of Search .............................. 358/1.15, 1.14, 358/1.16, 1.2, 1.4, 1.6, 1.18, 528, 538, 403, 358/405, 426.09, 437, 438; 710/20, 1, 5, 710/7, 14, 19, 31–34; 709/223–232

(56) References Cited

U.S. PATENT DOCUMENTS 5,038,299 A　8/1991　Maeda 5,716,148 A　*　2/1998　Tamagaki ..................... 400/74

FOREIGN PATENT DOCUMENTS

EP　　0 820 185 A2　　1/1998
JP　　10-322372　　12/1998
JP　　11-327815　　11/1999

* cited by examiner

*Primary Examiner*—Douglas Tran
(74) *Attorney, Agent, or Firm*—Sughrue Mion, PLLC

(57) ABSTRACT

A data communication apparatus to receive data for which continuity is ensured, without receiving the same data repeatedly. In the data communication apparatus, when a bus reset arises, and a reconnection request is received from a computer that informed the Command Block Agent ORB, whose execution was interrupted by that bus reset, the job execution part specifies print data that has not been obtained out of the print data of the storage area described in the ORB. The print data that has not been obtained is based on the number of Read Block Requests or Read Block Response, counted by the execution status monitoring part. Then, the job execution part makes a packet for print data generating part generate a Read Block Request to read only the print data that has not been obtained from the computer, and sends it to the computer.

9 Claims, 11 Drawing Sheets

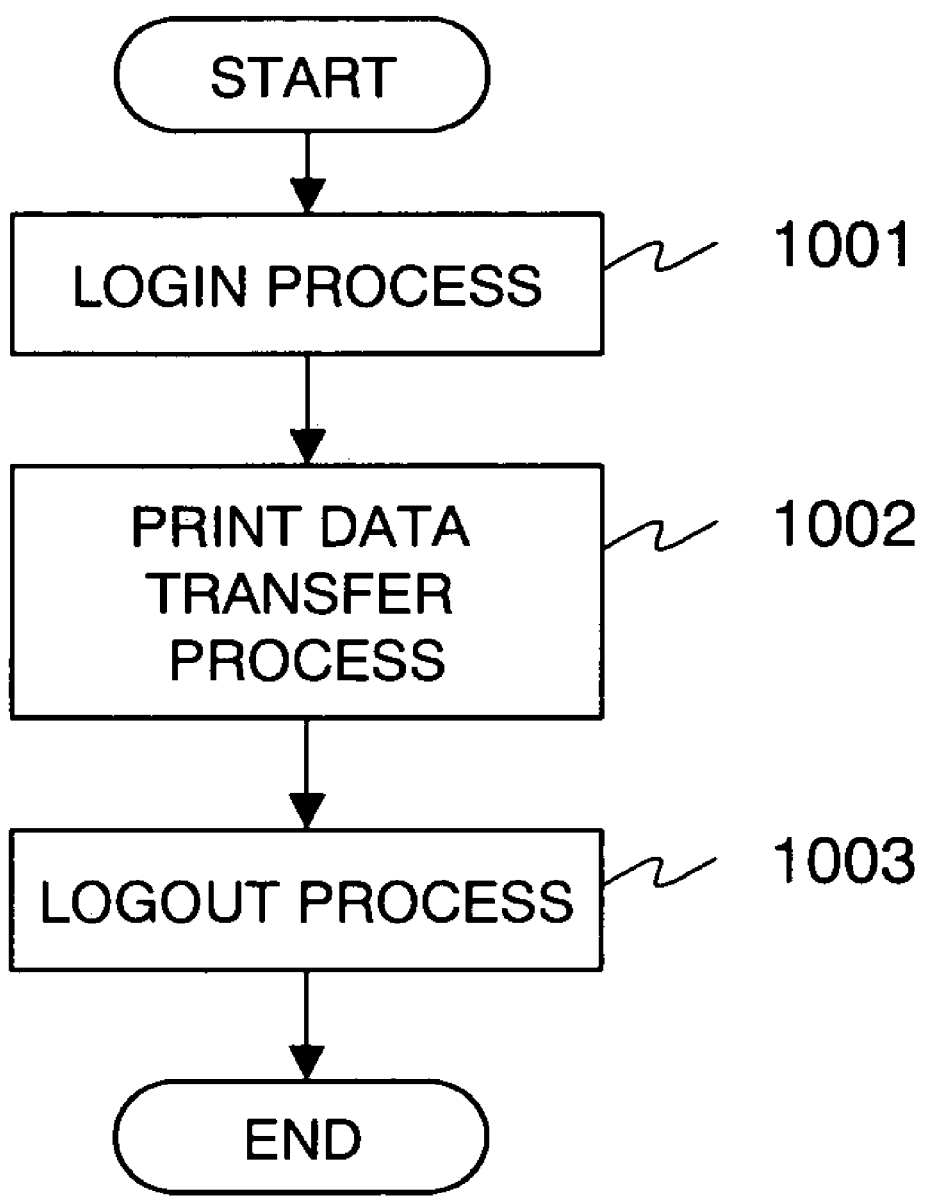

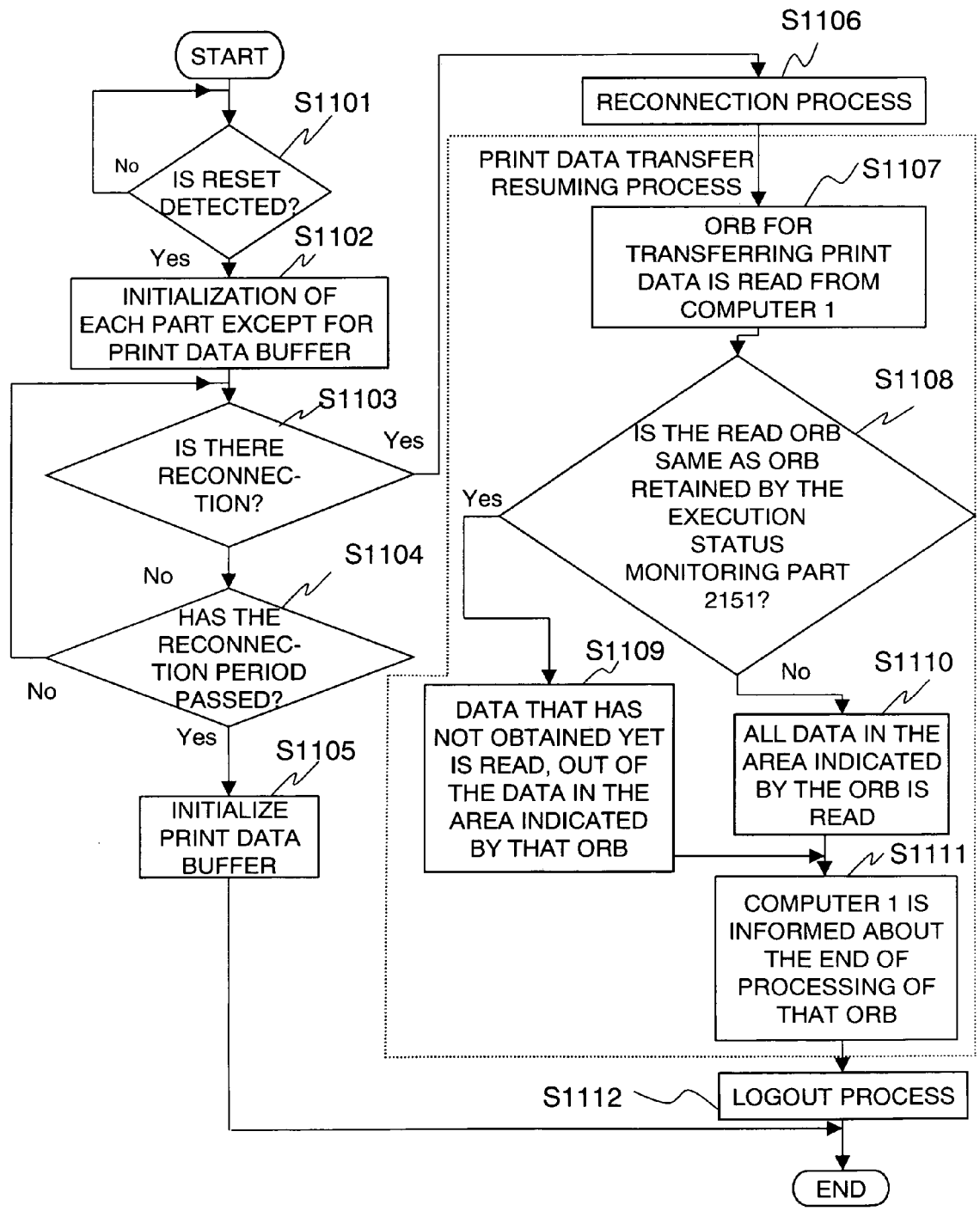

DATA COMMUNICATIONS APPARATUS FOR RESUMING DATA TRANSFER AFTER INTERRUPTION

BACKGROUND OF THE INVENTION

1. Field of the Invention

The present invention relates to a data communication apparatus that performs data communication with a partner apparatus through a communication line, and, in particular, to a data communication apparatus that performs data communication with a partner apparatus through a serial interface based on IEEE (The Institute of Electrical and Electronics Engineers, Inc.) 1394.

2. Related Art Statement

As a serial interface realizing high speed data transfer, has been proposed IEEE1394. In comparison with SCSI (Small Computer System Interface) that has been conventionally used as an interface between a computer and its peripheral devices, IEEE1394 has various advantages. For example, IEEE1394 supports automatic allocation of respective IDs of connected devices or disconnection of a connected device while it is connected to the power source (so-called hot swap).

In IEEE1394, the automatic allocation of ID to each connected device (node) is realized as follows.

Namely, first, each node recognizes itself as a "branch" connected to two or more nodes, or a "leaf" connected to only one node. Next, each node sends a parent_notify signal after a lapse of a predetermined time, in turn starting from a node that has recognized itself as a "leaf". On the other hand, a node that has recognized itself as a "branch" sends a child_notify signal to a node from which a parent_notify signal is received before the former sends a parent_notify signal. Thus, decision of parent-child relationships between nodes proceeds, to identify a tree structure having a root, i.e., a node that has recognized itself as a "branch" to which all the nodes are connected as children (Tree Identification).

Next, after the identification of the tree structure, each node sends, in prescribed turn, a self-packet including a physical_ID used by itself and management information, to open his own basic information to the other nodes. Here, into the physical_ID, is written the number of times self-packets are sent. In other words, a node that sends self-packet in the first place enters "0" in his physical ID, a node that sends self-packet in the second place enters "1" in the physical ID. By this arrangement, IDs used by respective nodes are automatically allocated (Self-recognition).

Further, according to IEEE1394, hot swap is realized as follows. Namely, when a new node is connected while connection topology of the bus is supervised, then, each node cancels information on the topology, and the tree identification and self-recognition are carried out again to perform automatic allocation of IDs of respective nodes (Bus Reset).

According to IEEE1394, during the bus reset, data communication between nodes is not carried out. Owing to this, when bus reset arises during data transfer, operation of a connected device is likely to be affected in a case where continuity (here, meaning not continuity from the viewpoint of time but continuity from the viewpoint of data itself) is required.

For example, in a case where data of high real-time property is transmitted, such as when a television broadcast signal received by a television receiver is sent to a monitor via an IEEE1394 interface to display, there appears such a symptom that a screen on the monitor is interrupted during bus reset. In other words, the television broadcast signal received by the television receiver during the bus reset can not be seen. In this case, subsequent monitor operation is not affected. After completion of the bus reset, the television broadcast signal received by the television receiver can be displayed on the monitor in real time, as before the bus reset.

However, for example, in a case where a program prepared by a computer is transferred to a storage device via an IEEE1394 interface or where print data prepared in a computer is transferred to a printer via an IEEE1394 interface, if data continuity is not ensured between before and after a break of data transfer owing to a bus reset, the transferred data loses its meaning.

In other words, when even a part of program data is lost, that program is not valid, and a computer can not execute that program. Further, print data includes a code formed of a data sequence of several bytes such that meaning of data following the code is defined by that code. Accordingly, when such a code is lost, illegal characters appear in the printed result.

For that reason, some technique adopts an idea that, when a bus reset arises while data is transferred through an IEEE1394 serial interface, and if the data in question requires data continuity such as program data or print data, then the transfer of the data in question is tried again from the beginning.

SUMMARY OF THE INVENTION

However, even when the above idea is employed, the following problem remains.

Namely, for example, some serial printer such as an ink jet printer starts printing when it receives print data for one line (one scan of a print head). Accordingly, if the print data is transferred again from the beginning, it is possible that same print data is printed repeatedly.

The present invention has been made taking the above situation into consideration. An object of the invention is to provide a data communication apparatus that can resume data transfer without repeating the data transfer from the beginning, when the data transfer is interrupted owing to generation of an event such as a bus reset.

To attain the above object, the present invention provides a data communication apparatus comprising: job execution means for receiving data from a partner apparatus, for executing a job; and job management means for managing an execution status of that job. When a job whose execution was interrupted by a given event is to be resumed, the job management means instructs the job execution means to resume the job, while presenting an execution status at a time when the execution of the job was interrupted. The job execution means refers to the execution status at the time when the execution of the job was interrupted, for receiving only data required for executing a non-processed part of the job, the execution status being presented by the job management means, relating to the job about which the instruction of resuming has been given.

According to the present invention, in resuming a job whose execution has been interrupted by a given event, the job execution means refers to the execution status presented by the job management means with respect to the time when the execution of that job was interrupted, and receives only the data required for executing the non-processed part of the job, from the partner apparatus. Accordingly, the same data is not received repeatedly, and data whose continuity is ensured can be received.

In a case where the data communication apparatus of the present invention performs data communication with a partner apparatus through a serial interface based on IEEE (The Institute of Electrical and Electronics Engineers, Inc.) 1394 and in accordance with a data transfer protocol based on SBP-2 (Serial Bus Protocol 2), the bus reset defined in IEEE1394 corresponds to "a given event" that interrupts execution of a job, for example.

In that case, the job execution means is realized as one that follows ORB (Operation Request Block), which is received from the partner apparatus as a job and contains data (in detail, data indicating the first address and a transfer data quantity) indicating a storage area of data to be transferred from the partner apparatus to the data communication apparatus itself, in order to generate and send Read Block Request that indicates a read start address and a predetermined read data quantity to the partner apparatus, and, in response to it, receives Read Block Response that contains read data, so that the job execution means sequentially reads the data by the predetermined data quantity from any address, so as to receive the data in the storage area indicated by the ORB.

Further, the job management means can manage the execution status of the ORB, by knowing that ORB under execution by the job execution means, and by knowing at least one of: the number of sending Read Block Requests generated to execute that ORB, the number of receiving Read Block Responses received from the partner apparatus as responses to those Read Block Requests, and the total byte number of the read data contained in those Read Block Responses.

Here, for example, when a request of the reconnection process defined by SBP-2 is received from the partner apparatus that sent the ORB whose execution was interrupted by a bus reset, and further, the same ORB as the interrupted ORB is received, then, the job management means may instruct the job execution means to resume the execution of the ORB by presenting at least one of the number of sending Read Block Requests, the number of receiving Read Block Responses, and the total byte number of the received data contained in those Read Block Responses at the time when the execution of the ORB was interrupted. And, the job execution means may generate Read Block Requests required for receiving the data that has not been obtained yet, excluding that has already obtained, out of the data in the storage area indicated in the ORB, specifying the data that has not been obtained yet by at least one of the number of sending Read Block Requests, the number of receiving Read Block Responses, and the total byte number of the received data contained in those Read Block Responses, at the time when the execution of the ORB was interrupted. Those numbers are presented by the job management means. The job execution means sends the generated Read Block Requests to the partner apparatus, and receives Read Block Responses in response to those Read Block Requests.

By this arrangement, even when receipt of data is interrupted by a bus reset, it is possible to receive the data which is ensured in its continuity, without receiving the same data repeatedly.

BRIEF DESCRIPTION OF THE DRAWINGS

FIG. 10 is a flowchart for explaining operation of the printer 2 in the print execution sequence shown in FIG. 2; and FIG. 11 is a flowchart for explaining operation of the printer 2 in the execution sequence for resuming print data transfer shown in FIG. 3.

DETAILED DESCRIPTION OF THE PREFERRED EMBODIMENTS

In the following, an embodiment of the present invention will be described.

Figure 1:
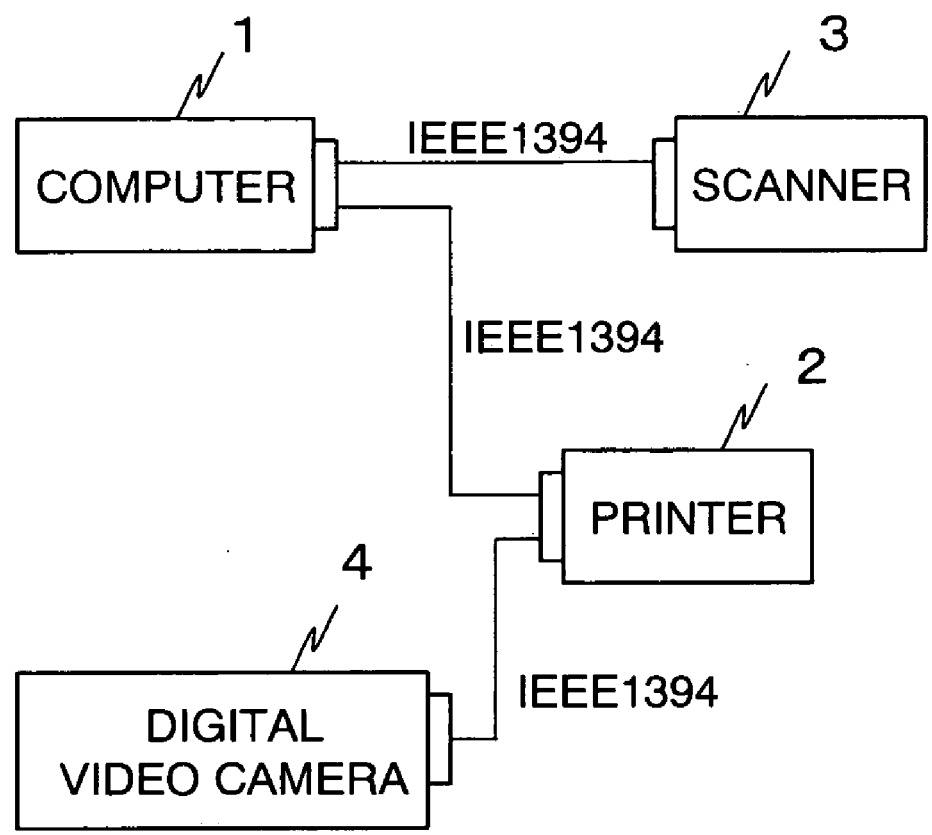
FIG. 1 is a schematic configuration showing a system including a printer 2 to which an embodiment of the present invention is applied.

FIG. 1 is a schematic configuration showing a system including a printer 2 to which an embodiment of the present invention is applied. Here, each of a computer 1, the printer 2, a scanner 3, and a digital video camera 4 is provided with a serial interface based on IEEE (The Institute of Electrical and Electronics Engineers, Inc.) 1394, and connected with one another through that interface. Further, it is assumed that, in the present system, at least data communication between the computer 1 and the printer 2 is carried out in accordance with a data communication protocol based on SBP-2 (Serial Bus Protocol 2).

In the following, for the sake of simplicity, only a data transfer process between the computer 1 and the printer 2 will be described.

First, a print execution sequence executed between the computer 1 and the printer 2 will be described.

Figure 2:
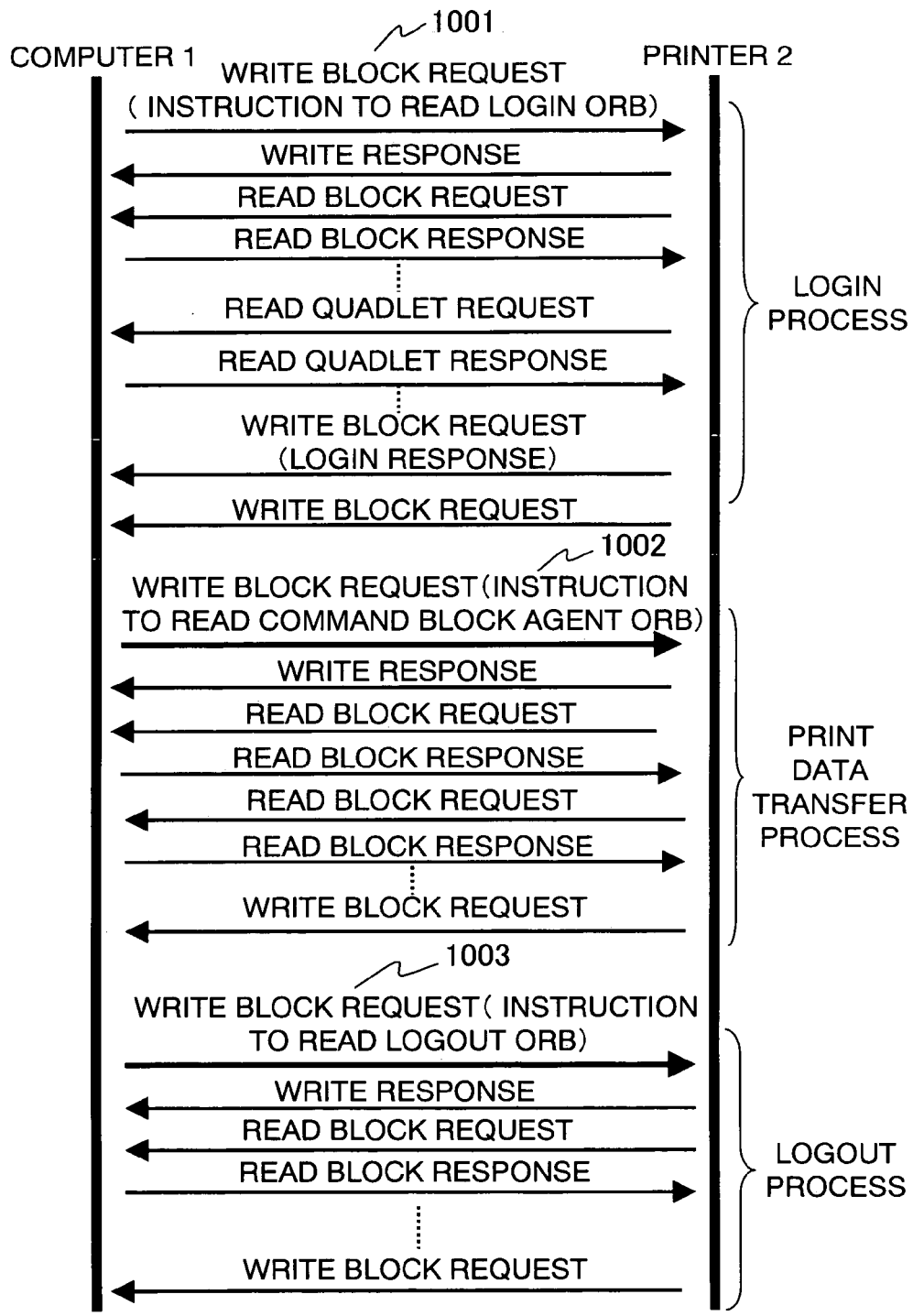
FIG. 2 shows a print execution sequence to be executed between a computer 1 and the printer 2 shown in FIG. 1.

FIG. 2 shows the print execution sequence carried out between the computer 1 and the printer 2.

As shown in the figure, the print execution sequence is partitioned into: 1. a login process; 2. a print data transfer process; and 3. a logout process.

1. Login Process

The computer 1 informs the printer 2 of Write Block Request 1001 in which a storage area (to be specific, the first address and transfer data quantity) for Login ORB (Operation Request Block) for the computer 1 to log in the printer 2 is described.

Receiving this, the printer 2 returns Write Response. Thereafter, the printer 2 generates Read Block Requests, each of which indicates a read start address and a predetermined read data quantity, one after another, to the number of times required for reading all the data in the storage area described in Write Block Request 1001. Here, this plurality of Read Block Requests are generated and sent sequentially such that, when one split transaction is ended, then, the next data following the data read from the computer 1 in that transaction is read in the next split transaction. By this, the printer 2 sequentially receives Read Block Responses from the computer 1, to obtain the Login ORB.

Next, when the printer 2 completes reading of Login ORB, the printer 2 sends Read Quadlet Request that indicates a read start address and a predetermined read data quantity, to read contents of configuration ROM of the computer 1, and obtains GUID (global ID) or the like of the computer 1 to identify the computer 1 which it logged in.

Then, the printer 2 sends Login Response as Write Block Request. The Login Response includes information such as an address (ORB pointer) on the side of the printer 2 at which Command Block Agent ORB should be written. Command Block Agent ORB describes a print data transfer instruction, a storage area for print data to be transferred and the like. Thereafter, a packet indicating that the processing of Login ORB is ended, is sent as Write Block Request.

2. Print Data Transfer Process

The computer 1 sends Write Block Request 1002 in which the address at which Command Block Agent ORB is stored is described, in order that the mentioned ORB is written at the ORB pointer indicated in Login Response sent from the printer 2.

Receiving this, the printer 2 returns Write Response. Next, the printer 2 generates and sends Read Block Request, in order to read Command Block Agent ORB that is stored at the address described in Write Block Request 1002.

Receiving this, the computer 1 sends, as Read Block Response, a packet that stores Command Block Agent ORB.

Next, the printer 2 analyzes Command Block Agent ORB stored in Read Block Response sent from the computer 1, and generates Read Block Requests, each of which describes a read start address and a predetermined data quantity (for example, 2 Kbytes) that can be transferred in one split transaction, one after another, to the number of times required for reading all the print data in the storage area described in the Command Block Agent ORB, in order to obtain the print data in the storage area described in that ORB. Here, this plurality of Read Block Requests are generated and sent sequentially such that, when one split transaction is ended, then, data following the data read from the computer 1 in that transaction is read in the next split transaction. By this, the printer 2 sequentially receives Read Block Responses from the computer 1, to obtain the print data.

Thereafter, the printer 2 sends, as Write Block Request, a packet indicating that the processing of the Command Block Agent ORB (transfer process of the print data) is ended.

3. Logout Process

The computer 1 informs the printer 2 of Write Block Request 1003 in which a storage area for Logout ORB for the computer 1 to log out the printer 2 is described.

Receiving this, the printer 2 returns Write Response. Thereafter, the printer 2 generates Read Block Requests, each of which indicates a read start address and a predetermined read data quantity, one after another, to the number of times required for reading all the data in the storage area described in the Write Block Request 1003. Here, this plurality of Read Block Requests are generated and sent sequentially such that, when one split transaction is ended, then, data following the data read from the computer 1 in that transaction is read in the next split transaction. By this, the printer 2 sequentially receives Read Block Responses from the computer 1, to obtain the Logout ORB.

Then, the printer 2 sends, as Write Block Request, a packet indicating that the processing of the Logout ORB is ended.

Next, an execution sequence for resuming print data transfer will be described. This sequence is executed between the computer 1 and the printer 2 in a case where the above-described print execution sequence is interrupted since a bus reset arises while that print execution sequence is executed.

When, for example, the scanner 3 is newly connected while print data is transferred between the computer 1 and the printer 2 by executing the above-described print execution sequence, then, that sequence is interrupted, causing a bus reset.

In the bus reset, as described above, each node cancels information on the bus connection topology, and the tree identification and self-recognition are carried out again to perform automatic allocation of IDs of respective nodes. Owing to this, it may happen that the node IDs of the computer 1 and the printer 2 are changed between before and after the bus reset. Accordingly, in SBP-2, when a bus reset arises while the computer 1 is in the middle of login to the printer 2, the computer 1 carries out reconnection process within a predetermined period, for making the printer 2 as the destination of the login confirm the node ID of the computer 1 itself again.

Figure 3:
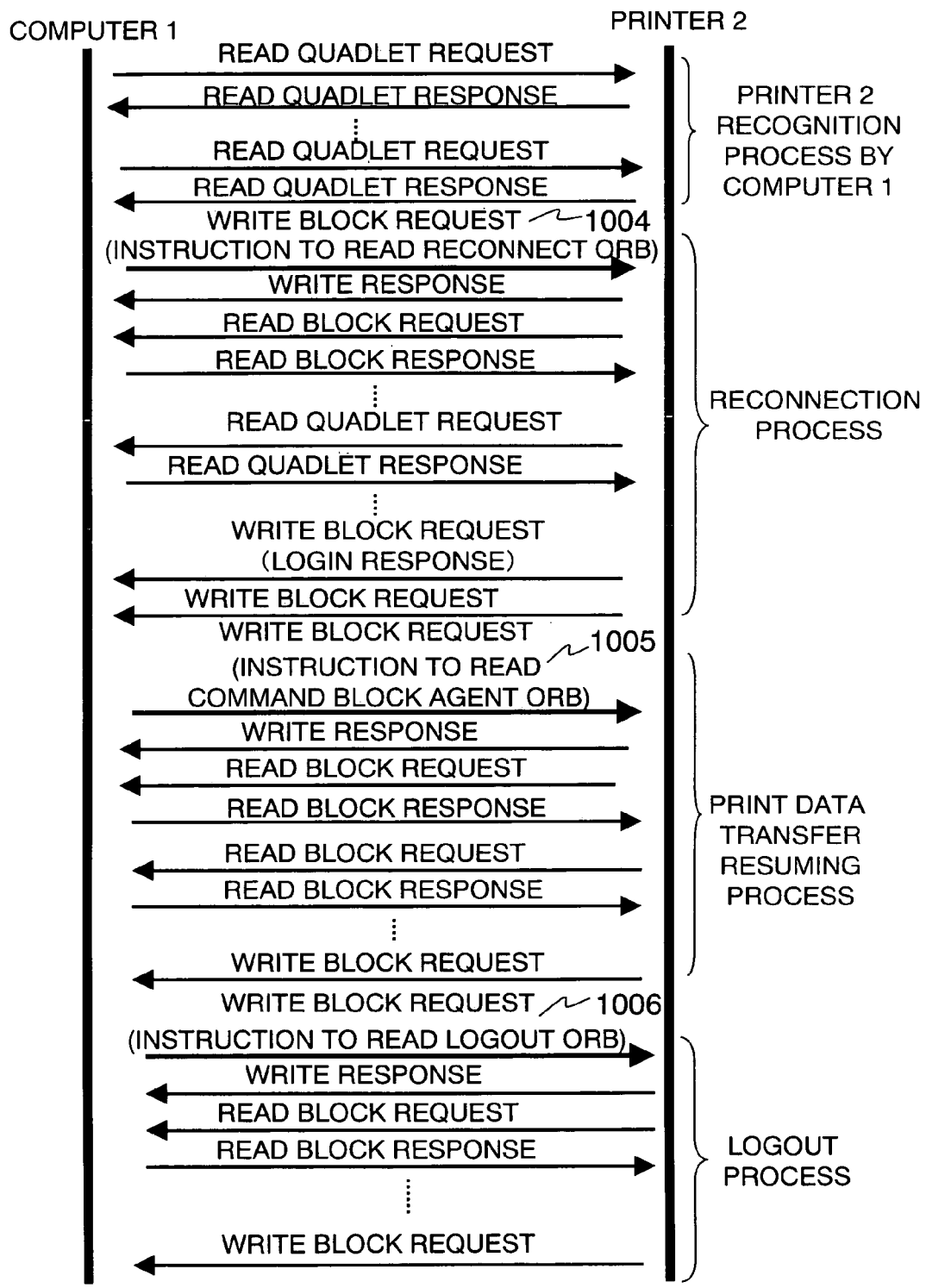
FIG. 3 shows an execution sequence for resuming print data transfer to be executed between the computer 1 and the printer 2 shown in FIG. 1.

FIG. 3 shows an execution sequence carried out between the computer 1 and the printer 2 for resuming print data transfer.

This sequence is carried out after a bus reset causes each node to cancel the information on the bus connection topology and after the tree identification and self-recognition are carried out again to perform automatic allocation of IDs of respective nodes. This sequence is partitioned into: 1. a printer 2 recognition process by the computer 1; 2. a reconnection process; 3. a print data transfer resuming process; and 4. a logout process.

1. Printer 2 Recognition Process by the Computer 1

The computer 1 obtains GUID and other information required for node recognition from each node, in order to recognize the correspondence between the newly-allocated node IDs and the nodes. In other words, the computer 1 sends Read Quadlet Request to each node, and receives Read Quadlet Response in response to it, in order to read the contents of configuration ROM and to obtain information such as GUID. By this operation, the printer 2 that was logged in before the bus reset can be identified.

2. Reconnection Process

The computer 1 informs the printer 2 about Write Block Request 1004 in which a storage area for Reconnect ORB for the computer 1 to be reconnected to the printer 2 is described.

Receiving this, the printer 2 returns Write Response. Thereafter, the printer 2 generates Read Block Requests to the number of times required for reading all the data in the storage area described in the Write Block Request 1004. Here, this plurality of Read Block Requests are generated and sent sequentially such that, when one split transaction is ended, then, data following the data read from the computer 1 in that transaction is read in the next split transaction. By this, the printer 2 sequentially receives Read Block Responses from the computer 1, to obtain the Reconnect ORB.

Next, when reading of the Reconnect ORB is ended, the printer 2 sends Read Quadlet Request, so as to read the contents of the configuration ROM of the computer 1 to obtain GUID etc. of the computer 1. By this, the printer 2 can identify the computer 1 that it logged in before the bus reset.

Then, the printer 2 sends, as Write Block Request, a packet indicating that the processing of the Reconnect ORB is ended.

3. Print Data Transfer Resuming Process

The computer 1 sends Write Block Request 1005 in which the address at which Command Block Agent ORB for print data transfer is stored is described, in order to write the mentioned ORB at the ORB pointer indicated in the Login Response packet informed from the printer 2 in the print execution sequence that has been interrupted by a bus reset.

Receiving it, the printer returns Write Response. Next, the printer 2 generates and sends Read Block Request, in order to read Command Block Agent ORB stored in the address described in the Write Block Request 1005. Receiving it, the computer 1 sends, as Read Block Response, a packet storing the Command Block Agent ORB.

Next, the printer 2 analyzes the Command Block Agent ORB stored in the Read Block Response informed from the computer 1. Then, the printer 2 judges if the print data storage area described in that ORB is same as the print data storage area described in the Command Block Agent ORB whose execution has been interrupted by the bus reset.

When they are same, then, in order to obtain print data that has not been obtained from the computer 1 in the processing of the above-mentioned ORB before the bus reset, out of the print data in the storage area described in that ORB, the printer 2 sequentially generates Read Block Requests, each of which describes a read start address and a predetermined data quantity (for example, 2 Kbytes) transferable in one split transaction, to the number of times required for reading all the data that has not been obtained yet. Here, this plurality of Read Block Requests are generated and sent sequentially such that, when one split transaction is ended, then, data following the data read from the computer 1 in that transaction is read in the next split transaction. By this, the printer 2 sequentially receives Read Block Responses from the computer 1, to obtain the print data that has not been obtained yet in the processing of the Command Block Agent ORB whose execution was interrupted by the bus reset.

On the other hand, in a case where the above-mentioned storage areas are different from each other, in order to obtain the print data in the storage area described in the analyzed Command Block Agent ORB, the printer 2 sequentially generates Read Block Requests, each of which describes a read start address and a predetermined data quantity (for example, 2 Kbytes) transferable in one split transaction, to the number of times required for reading all the print data in the storage area described in that ORB. Here, this plurality of Read Block Requests are generated and sent sequentially such that, when one split transaction is ended, then, data following the data read from the computer in that transaction is read in the next split transaction. By this, the printer 2 sequentially receives Read Block Responses from the computer 1, to obtain the print data in the storage area described in the ORB in question.

Thereafter, the printer 2 sends, as Write Block Request, a packet indicating that the processing of the Command Block Agent ORB (print data transfer process) is ended.

4. Logout Process

The computer 1 informs the printer 2 about Write Block Request 1006 in which a storage area for Logout ORB for the computer 1 to logout the printer 2 is described.

Receiving it, the printer 2 returns Write Response. Thereafter, the printer 2 sequentially generates Read Block Requests for reading data from the computer 1, to the number of times required for reading all the data in the storage area described in Write Block Request 1006. Here, this plurality of Read Block Requests are generated and sent such that, when one split transaction is ended, then, data following the data read from the computer 1 in that transaction is read in the next split transaction. By this, the printer 2 sequentially receives Read Block Responses from the computer 1, to obtain the Logout ORB.

Thereafter, the printer 2 sends, as Write Block Request, a packet indicating that the processing of the Logout ORB is ended.

As described above, in the present embodiment, when a print data transfer process caused by Command Block Agent ORB is interrupted by a bus reset, the printer 2 obtains, from the computer 1, only print data that has not been obtained yet in the processing of that ORB before the bus reset. By this arrangement, it is possible that, even when receipt of print data is interrupted by a bus reset, the printer 2 can receive the print data whose continuity is ensured, without receiving the same print data repeatedly.

Next, the computer 1 and the printer 2 that realize the above-described execution sequence for resuming print data transfer will be described.

First, the computer 1 will be described.

Figure 4:
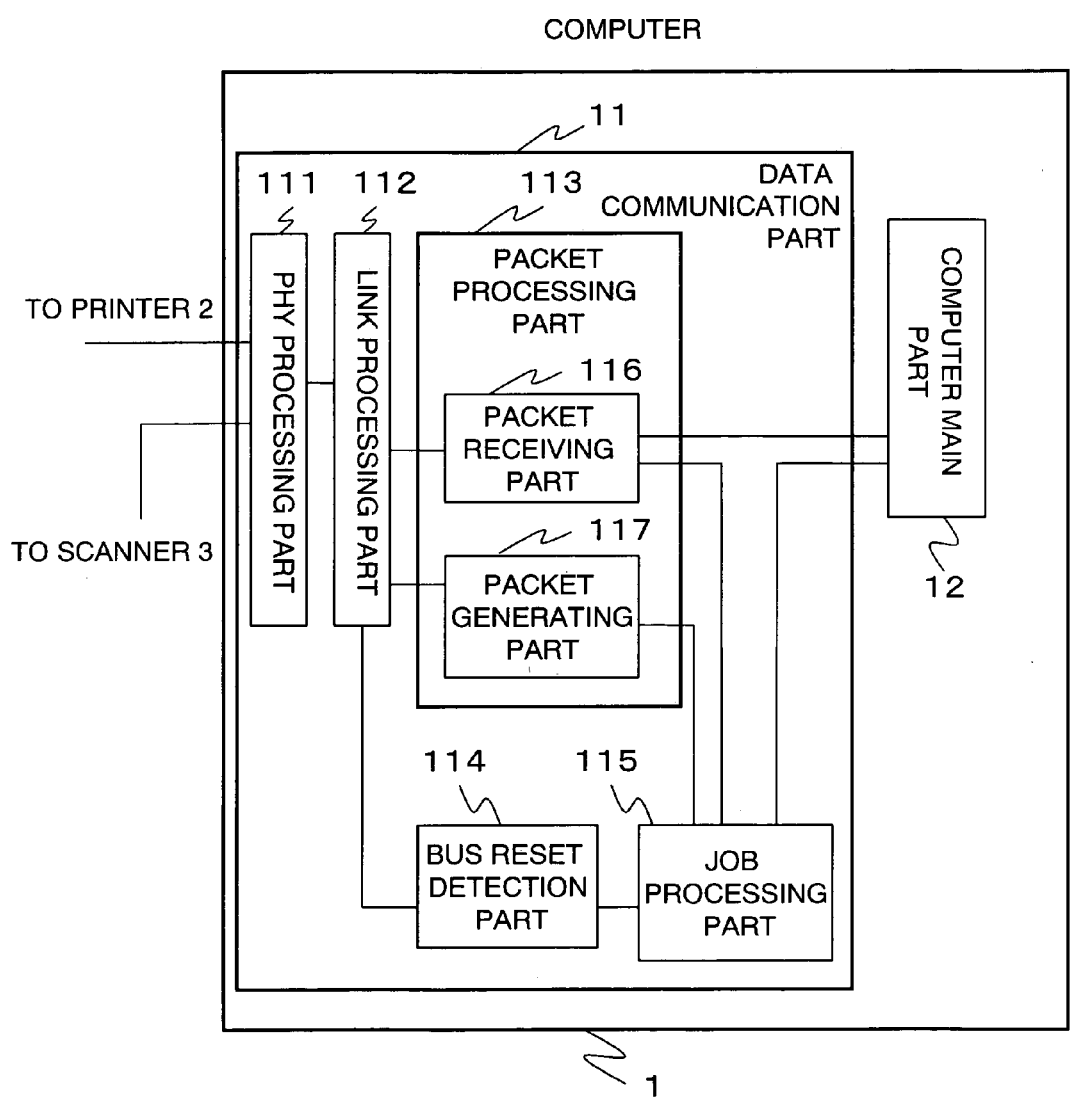
FIG. 4 is a schematic configuration showing the computer 1 of FIG. 1.

FIG. 4 is a schematic configuration of the computer 1 shown in FIG. 1.

As shown in the figure, the computer 1 comprises a data communication part 11 and a computer main part 12.

Figure 5:
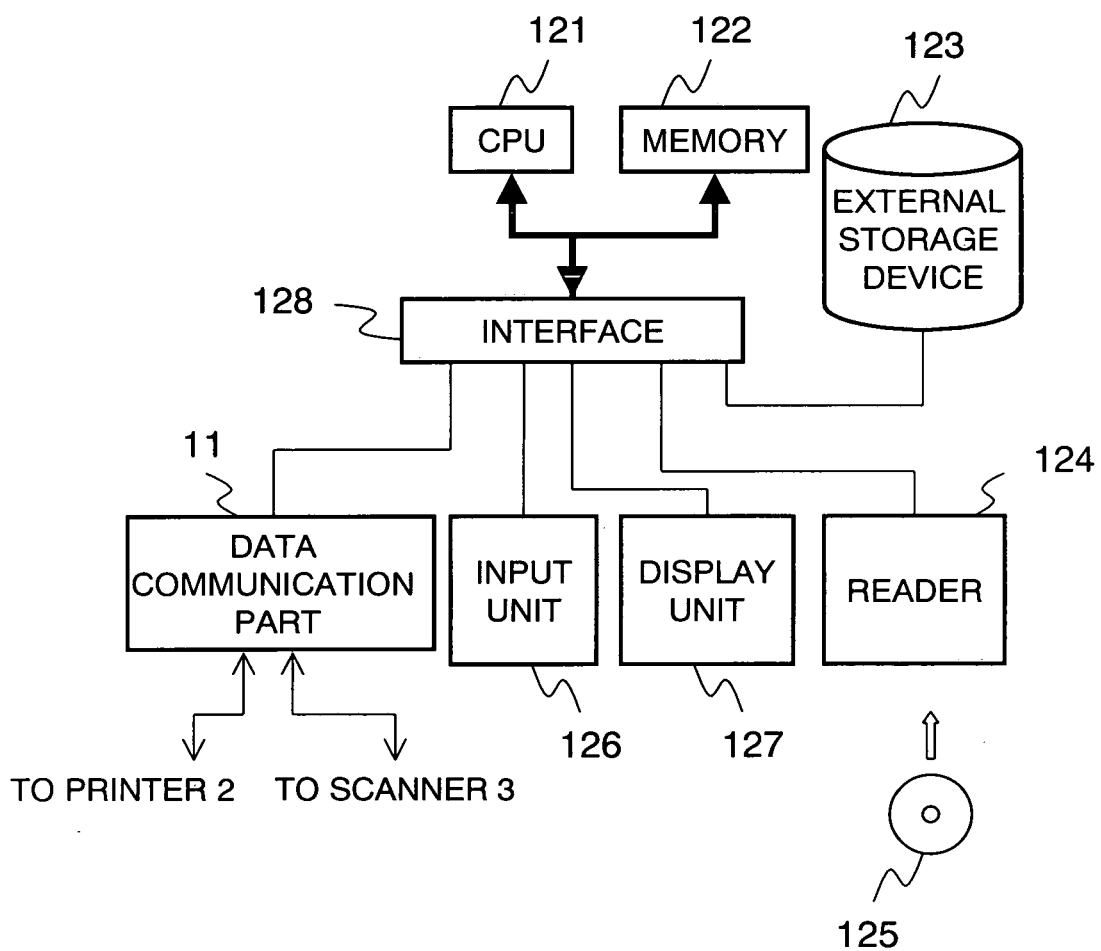
FIG. 5 is a view showing an example of hardware configuration of a computer main part 12 shown in FIG. 4.

As shown in FIG. 5, the computer main part 12 has a construction of an ordinary computer, comprising a CPU 121, a memory 122, an external storage device 123 such as a hard disk unit, a reader 124 for reading data from a portable storage medium 125 such as a CD-ROM or FD, an input unit 126 such as a keyboard or mouse, a display unit 127 such as a CRT or LCD display, and an interface 128 that is in charge of sending and receiving of data between elements including the above-described devices and the data communication part 11. Here, it is assumed that, in the computer main part 12, a printer driver program for controlling the printer 2 and an application program such as a word processing program or a graphics program for preparing print data to be printed by the printer 2 are in action.

The data communication part 11 comprises a PHY processing part 111 for executing a process in the physical layer of IEEE1394, a Link processing part 112 for executing a process in the link layer of IEEE1394, a packet processing part 113 for executing a process in the transaction layer of IEEE1394, a bus reset detection part 114 for detecting a bus reset defined in IEEE1394, and a job processing part 115 for processing the data transfer protocol based on SBP-2.

Here, each element constituting the data communication part 11 may be implemented as hardware using an integrated logic IC such as ASIC (Application Specific Integrated Circuits), FPLA (Field-Programmable Logic Array), and the like, or may be realized by software utilizing DSP (Digital Signal Processor). Further, the job processing part 115 may be realized such that the CPU 121 of the computer main part 12 executes a certain program. In addition, the data communication part 11 may be provided as a single device that can be fitted to the computer main part 12.

The job processing part 115 generates ORB (Operation Request Block), and requests the packet processing part 113 to generate a packet required for transferring that ORB to the printer 2. For example, Login ORB/Logout ORB for the computer 1 to log in/log out the printer 2, Command Block Agent ORB for the printer 2 to read print data from the computer 1, or the like is generated and stored in a predetermined storage area. Then, the job processing part 115 requests the packet processing part 113 to generate Write Block Request for the printer 2 to read those ORBs from the computer 1.

Further, when the bus reset detection part 114 detects a bus reset during execution of Command Block Agent ORB for the printer 2 to read print data from the computer 1, then, after the Link processing part 112 finishes the processing of the tree identification and the self-recognition, the job processing part 115 generates Reconnect ORB for the computer 1 to be reconnected to the printer 2 and stores it into a predetermined storage area of the computer main part 12. Then, the job processing part 115 performs the reconnection process by requesting the packet processing part 113 to generate Write Block Request for the printer 2 to read that ORB from the computer 1. Thereafter, the job processing part 115 requests again the packet processing part 113 to generate Write Block Request for the printer 2 to read, from the computer 1, the Command Block Agent ORB whose execution has been interrupted.

The packet processing part 113 comprises a packet receiving part 116 and a packet generating part 117.

The packet receiving part 116 receives a packet from a node through the PHY processing part 111 and the Link processing part 112.

The packet generating part 117 generates various packets in conformity with IEEE1394. For example, the packet generating part 117 generates Write Block Request for the printer 2 to read ORB generated by the job processing part 115, in accordance with an instruction from the job processing part 115. Or, the packet generating part 117 reads data required by Read Block Request received by the packet receiving part 116, and generates Read Block Response containing that data.

Next, the printer 2 will be described.

Figure 6:
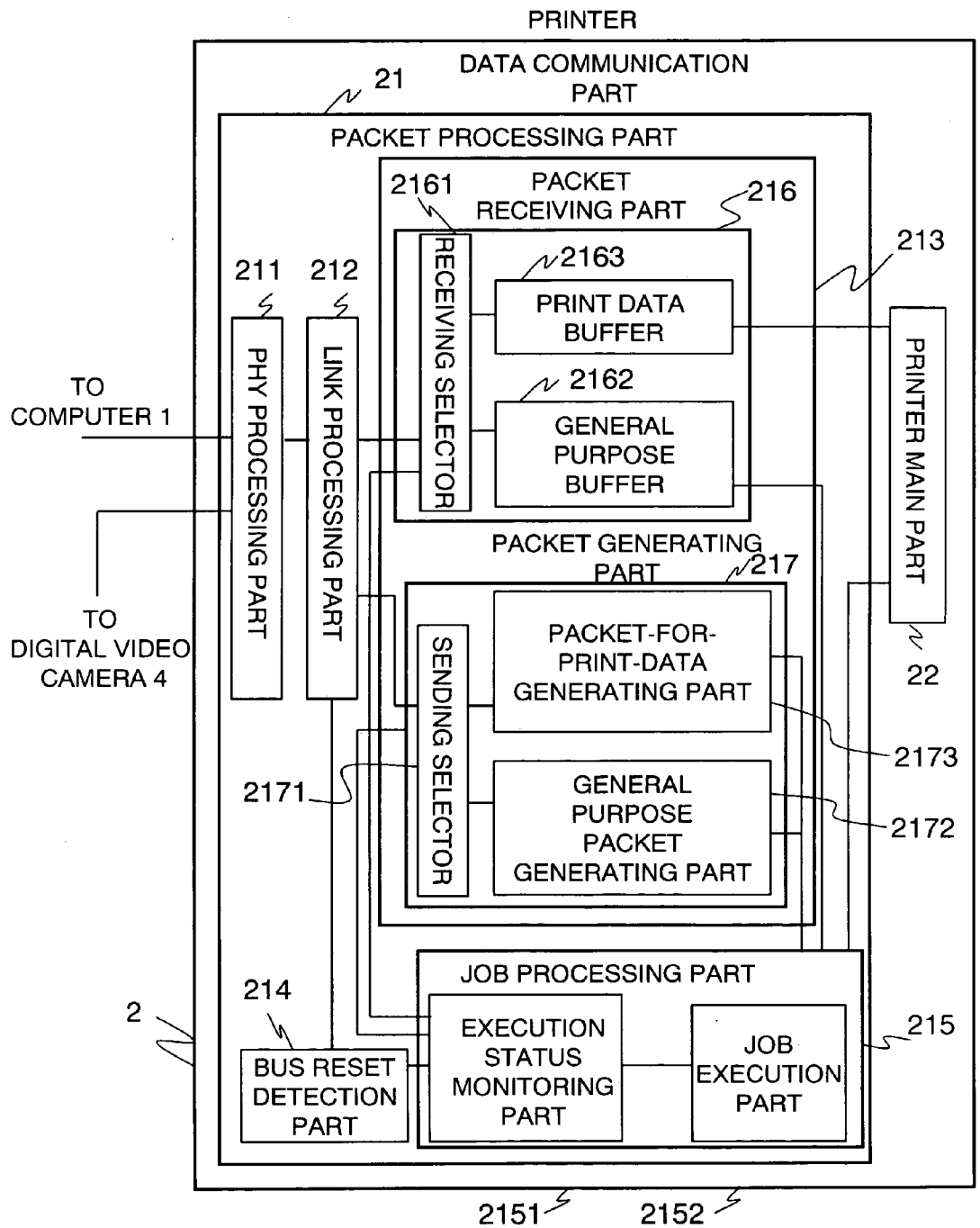
FIG. 6 is a schematic configuration of the printer 2 shown in FIG. 1.

FIG. 6 is a schematic configuration of the printer 2 shown in FIG. 1.

As shown in the figure, the printer 2 comprises a data communication part 21 and a printer main part 22.

Figure 7:
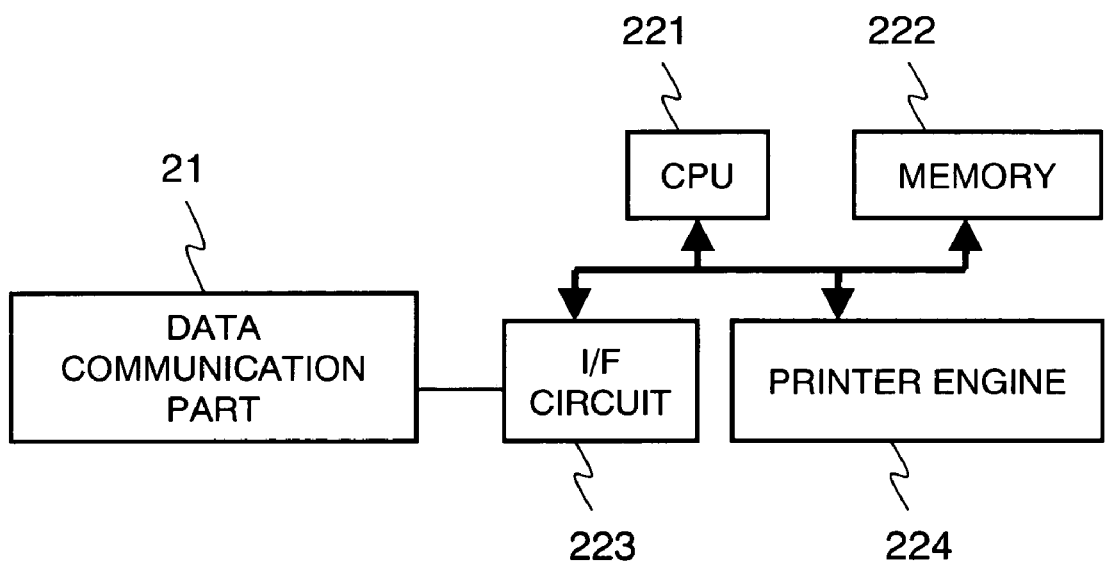
FIG. 7 is a view showing an example of hardware configuration of a printer main part 22 shown in FIG. 6.

As shown in FIG. 7, the printer main part 22 has a construction of an ordinary printer, comprising a memory 222, a CPU 221 for controlling various parts constituting the printer main part 22 by executing various programs stored in the memory 222, a printer engine 224 having mechanisms (for example, a print head for discharging ink, a platen, a carriage drive mechanism for driving a carriage that carries the print head, a paper drive mechanism, a feeding/discharging mechanism for performing feeding/discharging of a print medium, etc.) for printing data on a print medium, and an I/F circuit 223 in charge of sending/receiving data from the data communication part 21.

The data communication part 21 comprises a PHY processing part 211 for executing a process in the physical layer of IEEE1394, a Link processing part 212 for executing a process in the link layer of IEEE1394, a packet processing part 213 for executing a process in the transaction layer of IEEE1394, a bus reset detection part 214 for detecting a bus reset defined in IEEE 1394, and a job processing part 215 for processing the data transfer protocol based on SBP-2.

Here, each element constituting the data communication part 21 may be implemented as hardware using an integrated logic IC such as ASIC (Application Specific Integrated Circuits), FPLA (Field-Programmable Logic Array) and the like, or may be realized by software utilizing DSP (Digital Signal Processor). Further, the job processing part 215 may be realized such that the CPU 221 of the printer main part 22 executes a certain program. In addition, the data communication part 21 may be provided as a single device that can be fitted to the printer main part 22.

The packet processing part 213 comprises a packet receiving part 216 and a packet generating part 217.

The packet receiving part 216 comprises a print data buffer 2163, a general purpose buffer 2162, and a receiving selector 2161.

The print data buffer 2163 stores print data contained in Read Block Response informed from the computer 1, and sends the stored print data by the byte, i.e., as parallel data, to the printer main part 22.

Here, the size of the print data buffer 2163 is set to be larger (for example, 4 Kbytes) than the predetermined data quantity (for example, 2 Kbytes) that can be transferred in one split transaction and is described in Read Block Request generated for the printer 2 to obtain print data from the computer 1 (See the above-described print execution sequence or the execution sequence for resuming print data transfer).

As a time point at which print data stored in the print data buffer 2163 is send to the printer main part 22, may be employed, for example, a time point at which the data is stored in the print data buffer 2163.

The general purpose buffer 2162 stores data contained in a packet other than Read Block Response storing print data.

The receiving selector 2161 selects a buffer as a destination of sending a packet received through the PHY processing part 211 and the Link processing part 212. In detail, when the received packet is Read Block Response storing print data, the receiving selector 2161 selects the print data buffer 2163, and when the received packet is a packet other than Read Block Response storing print data, the receiving selector 2161 selects the general purpose buffer 2162. In SBP-2 (Serial Bus Protocol 2), a packet is provided with information indicating a kind of the packet. By investigating such information, the receiving selector 2161 can judge if the received packet is Read Block Response storing print data.

The packet generating part 217 comprises a packet-for-print-data generating part 2173, a general purpose packet generating part 2172, and a sending selector 2171.

The packet-for-print-data generating part 2173 generates Read Block Request in which a read start address and a quantity of data to be read is described and which is used for reading print data from the computer 1. The packet-for-print-data generating part 2173 monitors a free capacity of the print data buffer 2163 of the packet receiving part 216. Then, after confirming that the print data buffer 2163 has a free capacity for the read data quantity to be described in Read Block Request, the packet-for-print-data generating part 2173 generates that Read Block Request.

The general purpose packet generating part 2172 generates a packet other than the packet for Read Block Request for reading print data from the computer 1.

The sending selector 2171 selects either one of the packet-for-print-data generating part 2173 and the general purpose packet generating part 2172, and sends a packet generated by thus-selected packet generating part to the computer 1 through the PHY processing part 211 and the Link processing part 212.

The job processing part 215 comprises an execution status monitoring part 2151 and a job execution part 2152.

With respect to the Command Block Agent ORB for transferring the print data read from the computer 1, the execution status monitoring part 2151 counts the number of packets of Read Block Requests generated by the packet-for-print-data generating part 2172 in accordance with that ORB, and counts the number of packets of Read Block Responses received from the computer 1 in response to those Read Block Requests, until completion of the execution of that ORB.

The job execution part 2152 analyzes a packet stored in the general purpose buffer 2162, and performs processing in accordance with the contents of that packet.

For example, when the packet stored in the general purpose buffer 2162 is Write Block Request in which a destination of storing Login ORB/Logout ORB or Reconnect ORB is described, then, the job execution part 2152 informs the general purpose packet generating part 2172 about it, in order to obtain the ORB in question from the computer 1. Receiving it, the general purpose packet generating part 2172 generates Read Block Requests to the number of times required for reading the ORB whose storage area is described in the above-mentioned Write Block Request.

Further, for example, when the packet stored in the general purpose packet buffer 2162 is Read Block Response storing Command Block Agent ORB for transferring print data, then, the job execution part 2152 informs the packet-for-print-data generating part 2173 about it, in order to obtain the print data in the storage area described by that ORB from the computer 1. Receiving it, the packet-for-print-data generating part 2173, generates Read Block Requests to the number of times required for reading the print data whose storage area is described in the above-mentioned ORB.

Here, the above-mentioned Read Block Requests are sequentially generated and sent such that, when one split transaction is ended, data following the data read from the computer 1 in that transaction is read in the next split transaction.

Further, the job execution part 2152 initializes the packet generating part 217 and the packet receiving part 216, when a bus reset is detected by the bus reset detection part 214.

However, when a bus reset arises while Command Block Agent ORB for transferring print data read from the computer 1 is processed, initialization of the print data buffer 2163 of the packet receiving part 216 is postponed until the reconnection period prescribed by SBP-2 passes, after the bus reset.

When there arises reconnection from the computer 1 in that reconnection period, the print data buffer 2163 is not initialized if the storage area of the print data indicated by Command Block Agent ORB for transferring the print data newly read from the computer 1 is same as the storage area of the print data indicated by the Command Block Agent ORB whose execution is interrupted by the bus reset. With respect to that ORB, the job execution part 2152 specifies the storage area of the print data that has not been obtained yet, excluding the already-obtained print data (the print data that was already read before the bus reset), based on the print data storage area indicated by that ORB and the number of packets of Read Block Requests or Read Block Responses at the time when the execution of the ORB in question was interrupted by the bus reset. Then, the job execution part 2152 informs the packet-for-print-data generating part 2173 about it, in order to obtain the print data that has not been obtained yet, from the computer 1. Receiving it, the packet-for-print-data generating part 2173 generates Read Block Requests to the number of times required for reading the above-mentioned print data that has not been obtained yet.

On the other hand, when reconnection from the computer 1 does not arise within the reconnection period prescribed by SBP-2, or when reconnection arises and the print data storage area indicated by Command Block Agent ORB for transferring print data newly read from the computer 1 is different from the print data storage area indicated by the Command Block Agent ORB whose execution has been interrupted by the bus reset, then, the print data buffer 2163 is initialized.

Next, operations of the computer 1 and printer 2 of the above-described constructions will be described.

First, operation of the computer 1 will be described.

Figure 8:
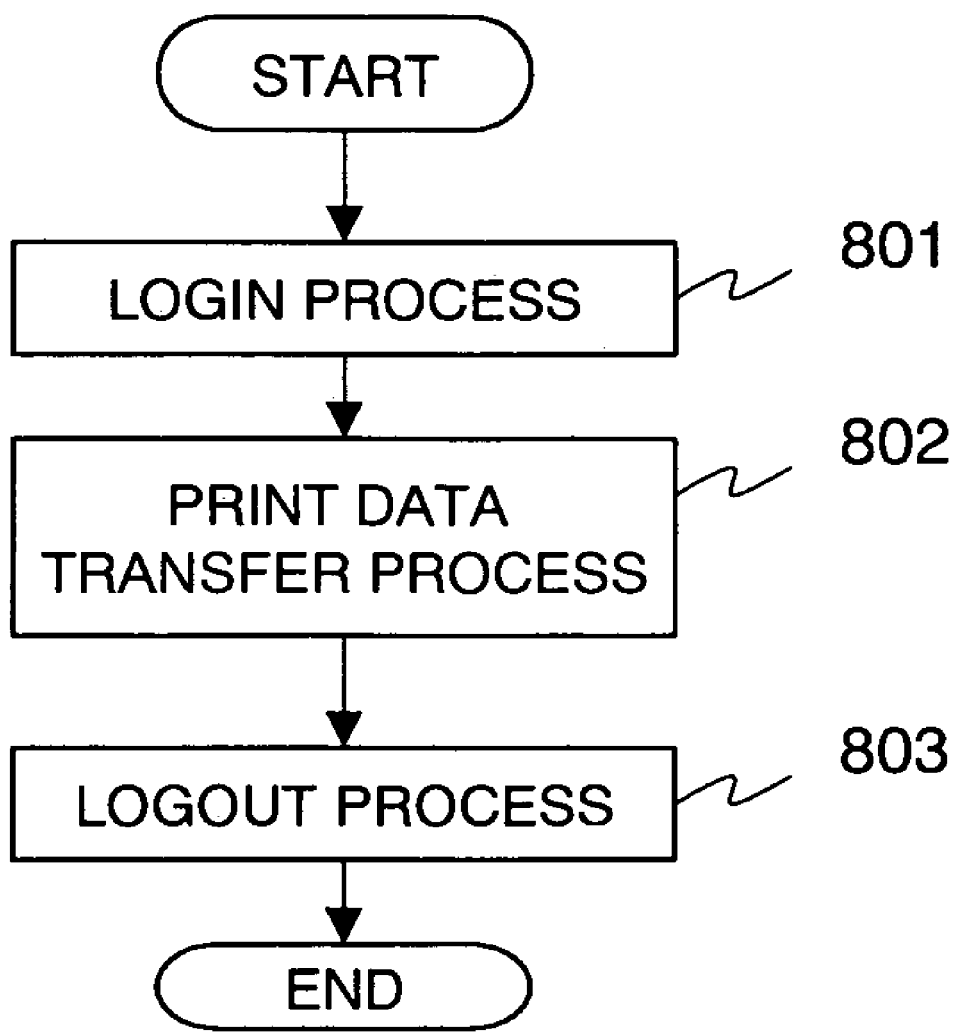
FIG. 8 is a flowchart for explaining operation of the computer 1 in the print execution sequence shown in FIG. 2.

FIG. 8 is a flowchart for explaining the operation of the computer 1 in the print execution sequence shown in FIG. 2.

When the job processing part 115 receives a print instruction from the computer main part 12, it executes the login process shown in FIG. 2 (step S801).

In detail, the job processing part 115 generates Login ORB for the computer 1 to log in the printer 2, and stores it into the prescribed storage area. Then, the job processing part 115 makes the packet generating part 117 generate Write Block Request in which the storage area of the Login ORB is described, and sends it to the printer 2. Thereafter, the packet generating part 117 reads the data required by Read Block Request received from the printer 2 through the packet receiving part 116, and sends Read Block Response including that data to the printer 2. By this, the printer 2 reads the Login ORB.

Then, the packet generating part 117 read the data required by Read Quadlet Request received from the printer 2 through the packet receiving part 116, and sends Read Quadlet Response containing that data to the printer 2. By this, the printer 2 reads the contents of the configuration ROM of the computer 1, and recognizes GUID (global ID) etc. of the computer 1. Next, the job processing part 115 obtains Login Response containing information such as an address (ORB pointer) on the side of the printer 2, at which Command Block Agent ORB for transferring the print data should be written. That Login Response is stored in the Write Block Request received from the printer 2 through the packet receiving part 116.

Next, the job processing part 115 executes the print data transfer process shown in FIG. 2 (step S802).

In detail, the job processing part 115 generates Command Block Agent ORB for transferring the print data, and stores it into the predetermined storage area. Then, the job processing part 115 makes the packet generating part 117 generate Write Block Request for the printer 2 to read that ORB, and sends it to the printer 2. Thereafter, the packet generating part 117 reads the data required by Read Block Request received by the packet receiving part 116, and sends Read Block Response containing that data to the printer 2. By this, the printer 2 reads the Command Block Agent ORB.

Then, the packet generating part 117 reads the data required by Read Block Request received by the packet receiving part 116, and sends Read Block Response containing that data to the printer 2. This process is repeated until the packet receiving part 116 receives Write Block Response indicating an end of the process (print data transfer process) in accordance with the above-mentioned Command Block Agent ORB. By this, the printer 2 reads the print data.

Next, the job processing part 115 executes the Logout process shown in FIG. 2 (step S803).

In detail, the job processing part 115 generates Logout ORB for logging out the printer 2, and stores it into the predetermined storage area. Then, the job processing part 115 makes the packet generating part 117 generate Write Block Request for the printer 2 to read that ORB, and sends it to the printer 2. Thereafter, the packet generating part 117 reads the data required by Read Block Request received by the packet receiving part 116, and sends Read Block Response containing that data to the printer 2. By this, the printer 2 reads the Logout ORB.

Figure 9:
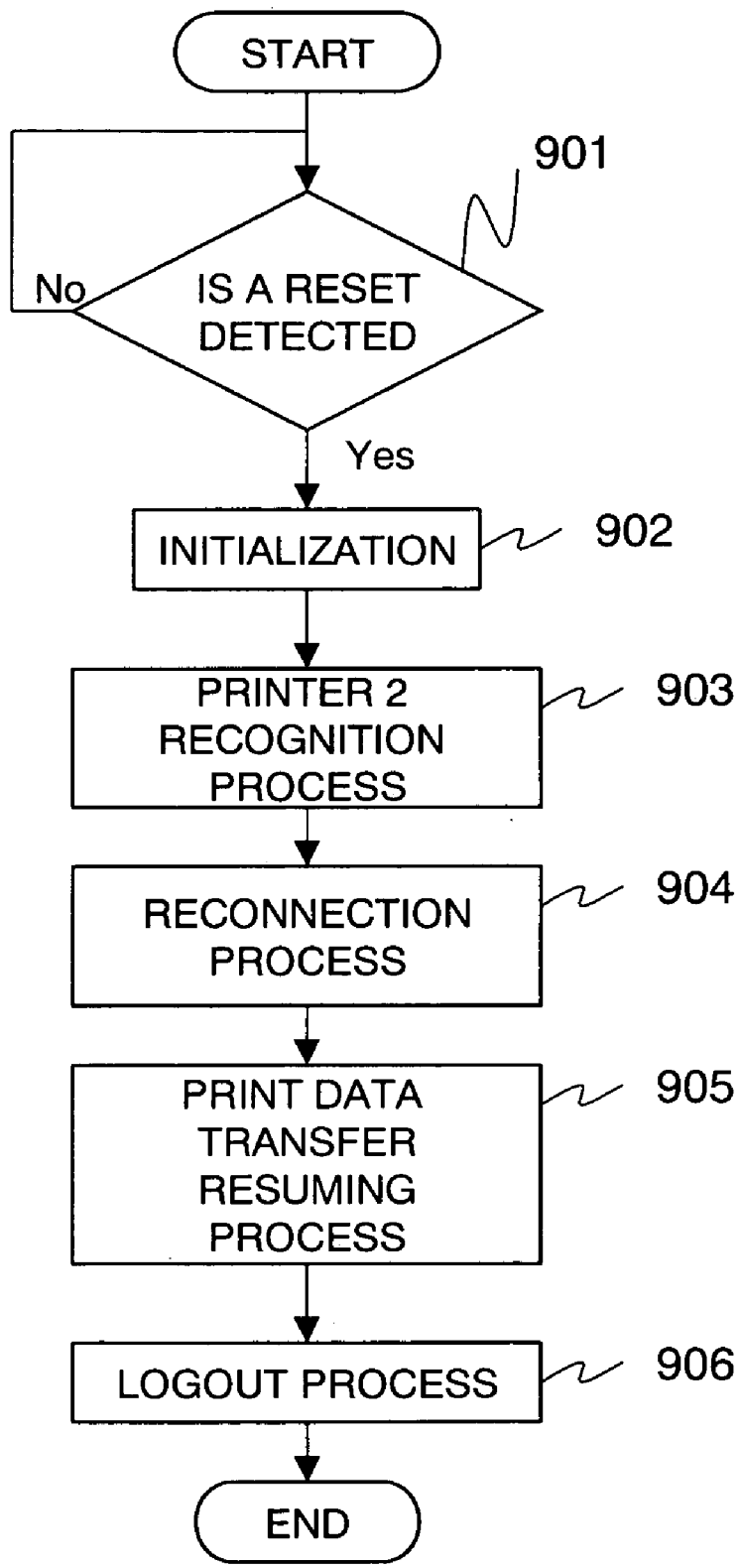
FIG. 9 is a flowchart for explaining operation of the computer 1 in the execution sequence for resuming print data transfer shown in FIG. 3.

FIG. 9 is a flowchart for explaining the operation of the computer 1 in the execution sequence for resuming print data transfer shown in FIG. 3.

When there arises a bus reset during login to the printer 2, then, the job processing part 115 detects it through the bus reset detection part 114 (step S901), and initializes the packet processing part 113 (step S902). Owing to the bus reset, the Link processing part 112 performs the tree identification and self-recognition in cooperation with the other nodes, to obtain the node IDs.

Next, the job processing part 115 performs the printer 2 recognition process shown in FIG. 3 (step S903).

In detail, the job processing part 115 makes the packet generating part 117 generate Read Quadlet Request, and sends it to a node of any node ID. Then, by receiving Read Quadlet Response in response to it, through the packet receiving part 116, the contents of the configuration ROM is read from that node, and information such as GUID is obtained. This process is carried out for all the nodes, to recognize the correspondence between the newly-allocated node IDs owing to the bus reset and the nodes. By this, the printer 2 that was logged in before the bus reset is identified.

Next, the job processing part 115 executes the reconnection process shown in FIG. 3 (step S904).

In detail, the job processing part 115 generates Reconnect ORB for reconnection to the printer 2, and stores it into the predetermined storage area. Then, the job processing part 115 makes the packet generating part 117 generate Write Block Request for the printer 2 to read that ORB, and sends it to the printer 2. Thereafter, the packet generating part 117 reads the data required by Read Block Request received by the packet receiving part 116, and sends Read Block Response containing that data to the printer 2. By this, the printer 2 reads the Reconnect ORB.

Next, the job processing part 115 executes the print data transfer resuming process shown in FIG. 3 (step S905).

In detail, the job processing part 115 generates Command Block Agent ORB in which a print data transfer instruction and the storage area for the print data to be transferred are described, and stores it into the predetermined storage area. Then, the job processing part 115 makes the packet generating part 117 generate Write Block Request for the printer 2 to read that ORB, and sends it to the printer 2. Thereafter, the packet generating part 117 reads the data required by Read Block Request received by the packet receiving part 116, and sends Read Block Response containing that data to the printer 2. By this, the printer 2 reads the Command Block Agent ORB.

Then, the packet generating part 117 reads the data required by Read Block Request received by the packet receiving part 116, and sends Read Block Response containing that data to the printer 2. This process is repeated until the packet receiving part 116 receives Write Block Response indicating an end of the process (print data transfer process) in accordance with the above-mentioned Command Block Agent ORB. By this, the printer 2 reads the print data.

When there arises a bus reset during the print data transfer process shown in FIG. 2, i.e., when a bus reset arises between the sending of Write Block Request for the printer 2 to read Command Block Agent ORB and the receiving Write Block Response indicating the end of the processing in accordance with that ORB, then, the job processing part 115 makes the packet generating part 117 generate Write Block Request again for the printer 2 to read the above-mentioned Command Block Agent ORB whose execution was interrupted, and sends it to the printer 2.

Next, the job processing part 115 executes the logout process shown in FIG. 3 (step S906).

In detail, the job processing part 115 generates Logout ORB for logging out the printer 2, and stores it into the predetermined storage area. Then, the job processing part 115 makes the packet generating part 117 generate Write Block Request for the printer 2 to read that ORB, and sends it to the printer 2. Thereafter, the packet generating part 117 reads the data required by Read Block Request received by the packet receiving part 116, and sends Read Block Response containing that data to the printer 2. By this, the printer reads the Logout ORB.

Next, the operation of the printer 2 will be described.

FIG. 10 is a flowchart for explaining the operation of the printer 2 in the print execution sequence shown in FIG. 2.

First, the job execution part 2152 executes the login process shown in FIG. 2 (step S1001).

In detail, when the job execution part 2152 receives Write Block Request in which the storage area of the Login ORB is described from the computer 1 through the general purpose buffer 2162, then, the job execution part 2152 makes the general purpose packet generating part 2172 generate Write Response, and sends it to the printer 2. Then, the job execution part 2152 makes the general purpose packet generating part 2172 generate Read Block Requests to the number of times required for reading the Login ORB whose storage area is described in Write Block Request, and sends them to the computer 1. In response to it, the job execution part 2152 receives Read Block Responses through the general purpose buffer 2162. By this, the Login ORB is read from the computer 1.

Next, when reading of the Login ORB is ended, the job execution part 2152 makes the general purpose packet generating part 2172 generate Read Quadlet Request, sends it to the computer 1, and, in response to it, receives Read Quadlet Response through the general purpose buffer 2162. By this, the contents of the configuration ROM of the computer 1 is read, and GUID etc. of the computer 1 is obtained, to identify the computer 1 that has logged in.

Then, the job execution part 2152 generates Login Response containing information such as an address (ORB pointer) on the side of the printer 2 at which Command Block Agent ORB describing a print data transfer instruction and the storage area for the print data to be transferred is stored, makes the general purpose packet generating part 2172 generate Write Block Request containing the Login Response, and sends it to the computer 1. Thereafter, the job execution part 2152 makes the general purpose packet generating part 2172 generate Write Block Request containing data indicating that the process of the Login ORB is ended, and sends it to the computer 1.

Next, the job execution part 2152 executes the print data transfer process shown in FIG. 2 (step S1002).

In detail, when the job execution part 2152 receives Write Block Request indicating the storage area of the Command Block Agent ORB in which the print data transfer instruction and the storage area of the print data are described, from the computer 1 through the general purpose buffer 2162, then, the job execution part 2152 makes the general purpose packet generating part 2172 generate Write Response, and sends it to the computer 1. Then, the job execution part 2152 makes the general purpose packet generating part 2172 generate Read Block Request for reading the Command Block Agent ORB from the computer 1. The Command Block Agent ORB is read from the storage area described in the Write Block Request. Then, the job execution part 2152 sends the generated Read Block Request to the computer 1, and receives Read Block Response in response to it, from the general purpose buffer 2162. By this, the Command Block Agent ORB is read from the computer 1.

Next, in order to obtain the print data in the storage area indicated by the Command Block Agent ORB read from the computer 1, the job execution part 2152 makes the packet-for-print-data generating part 2173 generate Read Block Request. Then, in response to that Read Block Request, Read Block Response is received from the computer 1, and it is stored into the print data buffer 2163. By this, the print data in the storage area indicated by the above-mentioned ORB is received.

When reading of the print data of the storage area indicated by the Command Block Agent ORB is ended, then, the job execution part 2152 makes the general purpose packet generating part 2172 generate Write Block Request indicating that the processing of the above-mentioned Command Block Agent ORB is ended, and sends it to the computer 1.

Next, the job execution part 2152 executes the logout process shown in FIG. 2 (step S1003).

In detail, the job execution part 2152 receives Write Block Request indicating the storage area for the Logout ORB from the computer 1 through the general purpose buffer 2162. Then, in order to read the Logout ORB from the storage area indicated by the Write Block Request, the job execution part 2152 makes the general purpose packet generating part 2172 generate Read Block Request, sends it to the computer 1, and, in response to it, receives Read Block Response through the general purpose buffer 2162. By this, the Logout ORB is read from the computer 1.

When reading of the Logout ORB is ended, the job execution part 2152 makes the general purpose packet generating part 2172 generate Write Block Request indicating that the processing of the Logout ORB is ended, and sends it.

FIG. 11 is a flowchart for explaining the operation of the printer 2 in the execution sequence for resuming print data transfer shown in FIG. 3.

When a bus reset arises during login of the computer 1, then, the execution status monitoring part 2151 detects it through the bus reset detection part 214 (step S1101), and initializes each part except for the print data buffer 2163 of the packet processing part 213 (step S1102).

Owing to the bus reset, the Link processing part 212 performs the tree identification and self-recognition in cooperation with the other nodes, to obtain the node IDs. Further, when Read Quadlet Request is sent from the computer 1 owing to the printer 2 recognition process shown in FIG. 3, the packet processing part 213 receives it through the general purpose buffer 2162, and reads the data required by that Request. Then, Read Quadlet Response containing that data is generated in the general purpose packet generating part 2172, and sent to the computer 1. By this, the computer 1 is informed of information such as GUID described in the configuration ROM of the printer 2.

Next, after the detection of the bus reset, the execution status monitoring part 2151 judges if there is a reconnection request within the reconnection period prescribed by SBP-2 (steps S1103 and S1104).

In detail, the job execution part 2152 investigates the packet stored in the general purpose buffer 2162, and make a judgment based on whether Write Block Request indicating the storage area of Reconnect ORB is received from the computer 1 within the reconnection period prescribed by SBP-2.

In a case where reconnection is not requested within the reconnection period prescribed by SBP-2, the print data buffer 2163 is initialized (step S1105), and the processing is ended.

On the other hand, when the computer 1 requests reconnection within the reconnection period prescribed by SBP-2, then the job execution part 2152 executes the reconnection process shown in FIG. 3 to recognize the computer 1 as the node that has requested the reconnection (step S1106).

In detail, when the job execution part 2152 receives Write Block Request indicating the storage area of Reconnect ORB from the computer 1, the job execution part 2152 makes the general purpose packet generating part 2172 generate Write Response, and sends it to the computer 1. Then, the job execution part 2152 makes the general purpose packet generating part 2172 generate Read Block Request for reading Reconnect ORB, from the storage area described by Write Block Request. The job execution part 2152 sends the generated Read Block Request to the computer 1, and, in response to it, receives Read Block Response from the general purpose buffer 2162. By this, Reconnect ORB is read from the computer 1.

Next, when reading of Reconnect ORB is ended, the job execution part 2152 makes the general purpose packet generating part 2172 generate Read Quadlet Request, sends it to the computer 1, and, in response to it, receives Read Quadlet Response from the general purpose buffer 2162. By this, the contents of the configuration ROM of the computer 1 is read, and GUID etc. of the computer 1 is obtained. By this, the job execution part 2152 recognizes the node requesting the reconnection as the computer 1 that logged in before the bus reset.

Thereafter, the job execution part 2152 makes the general purpose packet generating part 2172 generate Write Block Request containing data indicating that the processing of Reconnect ORB is ended, and sends it to the computer 1.

Next, the job execution part 2152 executes the print data transfer resuming process shown in FIG. 3 (steps S1107–S1111).

In detail, when the job execution part 2152 receives Write Block Request indicating the storage area of Command Block Agent ORB in which the print data transfer instruction and the storage area of the print data to be transferred are described, then, the job execution part 2152 makes the general purpose packet generating part 2172 generate Write Response, and sends it to the computer 1. Then, the job execution part 2152 makes the general purpose packet generating part 2172 generate Read Block Request for reading the Command Block Agent ORB from the storage area described in the Write Block Request, sends it to the computer 1, and, in response to it, receives Read Block Response from the general purpose buffer 2162. By this, the Command block Agent ORB for transferring the print data is read from the computer 1 (step S1107).

Next, if the Command Block Agent ORB for transferring the print data is retained in the execution status monitoring part 2151, the job execution part 2152 obtains that ORB and compares it with the Command Block Agent ORB obtained in the step S1107 (step S1108).

As described above, with respect to the Command Block Agent ORB for transferring the print data read from the computer 1, the execution status monitoring part 2151 counts the number of packets of Read Block Requests generated by the packet-for-print-data generating part 2173 in accordance with that ORB, and counts the number of packets of Read Block Responses received from the computer 1 in response to those Read Block Requests, until completion of the execution of that ORB. Accordingly, when the execution of that ORB is interrupted by a bus reset, the execution status monitoring part 2151 retains the number of packets of Read Block Requests generated by the packet-for-print-data generating part 2173 in accordance with that ORB until the bus reset and the number of packets of Read Block Responses received from the computer 1 in response to those Read Block Requests, with respect to that ORB.

In a case where, as a result of the comparison in the step S1108, the print data storage area indicated by the Command Block Agent ORB retained in the execution status monitoring part 2151 is same as the print data storage area indicated by the Command Block Agent ORB obtained in the step S1107, the job execution part 2152 performs the following process, in order to ensure the continuity of the print data between before and after the bus reset.

Namely, with respect to the Command Block Agent ORB obtained in the step S1107, the job execution part 2152 specifies the storage area of the print data that has not been obtained yet, excluding the already-obtained print data (the print data that was already read before the bus reset), based on the print data storage area (actually, which is specified by the start address and the transfer data quantity) indicated by that ORB and the number of packets of Read Block Requests or Read Block Responses retained in the execution status monitoring part 2151.

Then, in order to obtain the print data that has not been obtained yet from the computer 1, the job execution part 2152 makes the packet-for-print-data generating part 2173 generate Read Block Requests to the number of times required for reading the print data that has not been obtained yet, and send them to the computer 1. Then, in response to those Read Block Requests, Read Block Responses are received from the computer 1, and stored into the print data buffer 2163. By this operation, only the print data that has not been obtained yet is received (step S1109).

The execution status monitoring part 2151 clears the contents of the counting when the execution of the Command Block Agent ORB for transferring the print data is completed. Then, when new Command Block Agent ORB for transferring print data is executed, the execution status monitoring part 2151 starts counting.

On the other hand, in a case where the execution status monitoring part 2151 does not retain Command Block Agent ORB for transferring print data, or that, as a result of the comparison in the step S1108, the print data storage area indicated by the Command Block Agent ORB retained in the execution status monitoring part 2151 is different from the print data storage area indicated by the Command Block Agent ORB obtained in the step S1107, then, the job execution part 2152 makes the packet-for-print-data generating part 2173 generate Read Block Request, and sends it to the computer 1, in order to obtain, from the computer 1, the print data of the storage area indicated by the Command Block Agent ORB obtained in the step S1107. Then, in response to that Read Block Request, Read Block Response is received from the computer 1, and stored into the data buffer 2163. By this, the print data of the storage area indicated by the above-mentioned ORB is received (step S1110).

Next, when the process of the step S1109 or S1110 for reading the print data is ended, the job execution part 2152 makes the general purpose packet generating part 2172 generate Write Block Request indicating that the processing of the Command Block Agent ORB obtained in the step S1107 is ended, and sends it to the computer 1 (step S1111).

Next, the job execution part 2152 executes the logout process shown in FIG. 3 (step S1112).

In detail, the job execution part 2152 receives Write Block Request indicating the storage area of Logout ORB, from the computer 1 through the general purpose buffer 2162. Then, in order to read the Logout ORB from the storage area indicated by the Write Block Request, the job execution part 2152 makes the general purpose packet generating part 2172 generate Read Block Request, sends it to the computer 1, and, in response to it, receives Read Block Response through the general purpose buffer 2162. By this, the Logout ORB is read from the computer 1.

When the process of reading the Logout ORB is ended, the job execution part 2512 makes the general purpose packet generating part 2172 generate Write Block Request containing data indicating that the processing of the Logout ORB is ended, and sends it to the computer 1.

In the above, one embodiment of the present invention has been described.

According to the printer 2 of the present embodiment, when a request of the reconnection process defined in SBP-2 is received from the computer 1 that informed Command Block Agent ORB whose execution was interrupted by a bus reset, and further, the same Command Block Agent ORB as the interrupted Command Block Agent ORB is received, then the job execution part 2152 specifies the storage area of the data that has not been obtained yet, excluding the data obtained before the bus reset, out of the data of the storage area described in that ORB in accordance with the number of sending Read Block Request or the number of receiving Read Block Response at the time when the execution of the ORB is interrupted, which was counted by the execution status monitoring part 2151. Then, the job execution part 2152 makes the packet-for-print-data generating part 2173 generate Read Block Requests to the number of times required for reading that specified data that has not been obtained, and sends them to the computer 1.

Further, with respect to the print data contained in Read Block Responses sent by the computer 1 in response to those Read Block Requests, the receiving selector 2161 stores that data into the print data buffer 2163. Even when a bus reset arises, the job execution part 2152 does not immediately initialize the print data buffer 2163, but initializes it if there does not arise reconnection from the computer 1 within the reconnection period defined in SBP-2, after completion of the bus reset.

By such operation, the printer 2 can ensure the continuity of the print data, which is stored in the print data buffer 2163, without repeating the same data, even when receiving is interrupted by a bus reset. Accordingly, for example, even in a case of a serial printer such as an ink jet printer, which starts printing on receiving print data for one line (one scan of a print head), it does not happen that same print data is printed repeatedly after a bus reset.

Further, in the present embodiment, the size of the print data buffer 2163 is set to a value (for example, 4 Kbytes) larger than a predetermined data quantity (for example, 2 Kbytes) that can be transferred in one split transaction described in Read Block Request generated for the printer 2 to obtain the print data from the computer 1. Owing to this, print data of Read Block Response sent from the computer 1 in response to that Read Block Response is stored in the print data buffer 2163 at one time. Accordingly, the execution status monitoring part 2151 can monitor the execution status of the job (print data transfer/transfer resuming process) caused by Command Block Agent ORB, by counting the number of sending Read Block Requests or the number of receiving Read Block Responses, thus making the monitoring easy.

In the present embodiment, in order to monitor the execution status concerning Command Block Agent ORB, both the number of sending Read Block Requests for reading print data of the storage area described in the Command Block Agent ORB and the number of receiving Read Block Responses as responses to those Requests are counted. However, either one may be counted. Or, the execution status of Command Block Agent ORB may be monitored by counting the total byte number of the print data contained in the mentioned Read Block Responses. This can be realized, for example, by counting the byte number of data inputted into the print data buffer 2163.

Further, in the present embodiment, data communication is performed with a partner apparatus through the serial interface based on IEEE1394 and in accordance with the data transfer protocol based on SBP-2. However, the present invention is not limited to this. For example, the present invention can be widely applied to other data transfer protocols, such as DPP (Direct Printer Protocol) in which data transfer may be interrupted owing to a certain event.

Further, the data communication apparatus of the present invention is not limited to a printer. The present invention can be applied to various devices to be connected, such as a scanner and a digital video camera.

As described above, according to the present invention, it is possible to receive data for which continuity is ensured, without receiving the same data repeatedly.

What is claimed is:

1. A data communication apparatus for performing data communication with a partner apparatus through a communication line, said data communication apparatus comprising:

job execution means for receiving data from the partner apparatus, for executing a job; and job management means for managing an execution status of said job; wherein:

when execution of said job is interrupted by a given event, and is to be resumed, said job management means instructs said job execution means to resume said job, while presenting an execution status at a time when the execution of said job was interrupted; and said job execution means refers to the execution status at the time when the execution of said job was interrupted, for receiving only data required for executing a non-processed part of said job, said execution status being presented by said job management means, relating to said job about which the instruction of resuming has been given, wherein:

said data communication apparatus performs communication with the partner apparatus through a serial interface based on IEEE (The Institute of Electrical and Electronics Engineers, Inc.) 1394 and in accordance with a data transfer protocol based on SBP-2 (Serial Bus Protocol 2);

said job execution means follows ORB (Operation Request Block), which is received from the partner apparatus as said job and contains data indicating a storage area of data to be transferred from said partner apparatus to said data communication apparatus, in order to generate and send Read Block Request that indicates a read start address and a predetermined read data quantity to the partner apparatus, and receives, in response, Read Block Response that contains read data, so that the job execution means sequentially reads the data by the predetermined data quantity from any address, so as to receive the data in the storage area indicated by said ORB; and when said job management means instructs said job execution means to resume execution of the ORB whose execution was interrupted by a given event, then, the job execution means refers to the execution status presented from said job management means relating to the time when the execution of said ORB was interrupted, in order to generate Read Block Requests required for receiving data that has not been obtained yet, excluding data that has already obtained, out of the data in the storage area indicated in said ORB, to send said Read Block Requests to the partner apparatus, and to receive Read Block Responses as responses to said Read Block Requests.

2. The data communication apparatus according to claim 1, wherein:

said data communication apparatus further comprises bus reset detection means for detecting a bus reset defined by IEEE1394, as said given event;

said job management means comprises:

means for managing the execution status of said ORB by knowing ORB under execution by said job execution means and at least one of: a number of sending Read Block Requests generated to execute said ORB, a number of receiving Read Block Responses received from the partner apparatus as responses to said Read Block Requests, and a total byte number of read data contained in said Read Block Responses; and instruction means for giving instruction to said job execution means to resume the execution of said ORB when a reconnection process defined by SBP-2 is requested from the partner apparatus that sent the ORB whose execution was interrupted by a bus reset detected by said bus reset detection means and, thereafter, a same ORB as said interrupted ORB is sent again, said instruction being given by presenting at least one of: a number of sending Read Block Requests, a number of receiving Read Block Requests, and a total byte number of received data contained in said Read Block Responses, at the time when the execution of said ORB was interrupted; and when said job management means gives instruction of resuming said ORB, said job execution means generates Read Block Requests required for receiving the data that has not been obtained yet, excluding the data that has already obtained, out of the data in the storage area indicated in said ORB, specifying said data that has not been obtained yet by at least one of: the number of sending Read Block Requests, the number of receiving Read Block Responses, and the total byte number of the received data contained in said Read Block Responses, at the time when the execution of said ORB was interrupted, those numbers being presented by said job management means; and said job execution means sends the generated Read Block Requests to the partner apparatus, and receives Read Block Responses in response.

3. The data communication apparatus according to claim 2, wherein:

said data communication apparatus further comprises a buffer for storing data contained in Read Block Response corresponding to Read Block Request for executing the ORB received by said job execution means; and data stored in said buffer is not cleared even when a bus reset is detected by said bus reset detection means.

4. The data communication apparatus according to claim 3, further comprising:

reset means that clears the data stored in said buffer, when a request of said reconnection process is not received within a predetermined period from the partner apparatus that sent the ORB whose execution was interrupted by a bus reset, after said bus reset is detected by said bus reset detection means.

5. The data communication apparatus according to claim 4, wherein:

a size of the data contained in Read Block Response corresponding to Read Block Request for executing the ORB received by said job execution means is smaller than a size of said buffer.

6. The data communication apparatus according to claim 4, wherein:

said job execution means sends the partner apparatus Read Block Request generated for executing said ORB after a free capacity of said buffer becomes larger than the read data quantity indicated in said Read Block Request.

7. A printer provided with the data communication apparatus according to claim 4, wherein:

said buffer sends the stored data to a printer main part by the byte.

8. A data communication apparatus for performing data communication with a partner apparatus through a communication line, said data communication apparatus comprising:

a job execution part that receives data from the partner apparatus for executing a job; and a job management part that manages an execution status of said job; wherein:

when execution of said job is interrupted by a given event, and is to be resumed, said job management part instructs said job execution part to resume said job while referring to an execution status at a time when the execution of said job was interrupted, said job execution part refers to the execution status at the time when the execution of said job was interrupted in order to receive data required for executing a non-processed part of said job, said data communication apparatus performs communication with the partner apparatus through a serial interface based on IEEE 1394 and in accordance with a data transfer protocol based on SBP-2, said job execution part follows an Operation Request Block, which is received from the partner apparatus as said job, and contains data indicating a storage area of data to be transferred from said partner apparatus to said data communication apparatus, in order to generate and send a Read Block Request that indicates a read start address and a predetermined read data quantity to the partner apparatus, said job execution part receives, in response, a Read Block Response that contains read data, so that the job execution part sequentially reads the data by the predetermined data quantity from any address, so as to receive the data in the storage area indicated by said Operation Request Block, and when said job management part instructs said job execution part to resume execution of the Operation Request Block, whose execution was interrupted by a given event, the job execution part refers to the execution status presented from said job management part which relates to the time when the execution of said Operation Request Block was interrupted, in order to generate Read Block Requests required for receiving data that has not yet been obtained, and to send said Read Block Requests to the partner apparatus, the partner apparatus sending Read Block Responses to said Read Block Requests.

9. The data communication apparatus according to claim 8, wherein said given event is a bus reset.

* * * * *